US006850544B2

United States Patent
Friesem et al.

(10) Patent No.: US 6,850,544 B2
(45) Date of Patent: Feb. 1, 2005

(54) OPTICAL RESONATORS WITH ORTHOGONALLY POLARIZED MODES

(75) Inventors: Asher A. Friesem, Rehovot (IL); Shmuel Blit, Rehovot (IL); Ram Oron, Rehovot (IL); Erez Hasman, Kiryat Ono (IL); Nir Davidson, Rishon Le Zion (IL)

(73) Assignee: Yeda Research and Development Co., Ltd., Rehovot (IL)

(*) Notice: Subject to any disclaimer, the term of this patent is extended or adjusted under 35 U.S.C. 154(b) by 0 days.

(21) Appl. No.: 10/099,473

(22) Filed: Mar. 15, 2002

(65) Prior Publication Data

US 2002/0154672 A1 Oct. 24, 2002

Related U.S. Application Data

(63) Continuation of application No. PCT/IL00/00563, filed on Sep. 13, 2000.

(30) Foreign Application Priority Data

Sep. 15, 1999 (IL) ................................................ 131906
Sep. 10, 2000 (IL) ................................................ 138366

(51) Int. Cl.⁷ .............................................. H01S 3/098
(52) U.S. Cl. ............................ 372/19; 372/27; 372/93; 372/105; 372/106
(58) Field of Search ............................ 372/19, 23, 27, 372/93–95, 105, 106

(56) References Cited

U.S. PATENT DOCUMENTS

| | | | |
|---|---|---|---|
| 3,605,039 A | 9/1971 | Harris | |
| 4,559,627 A | 12/1985 | Chun | 372/92 |
| 4,575,849 A | 3/1986 | Chun | 372/9 |
| 4,637,027 A * | 1/1987 | Shirasaki et al. | 372/27 |
| 4,682,340 A * | 7/1987 | Dave et al. | 372/108 |
| 4,720,633 A | 1/1988 | Nelson | |
| 4,880,976 A | 11/1989 | Mancuso | |
| 5,091,912 A * | 2/1992 | Bretenaker et al. | 372/23 |
| 5,179,563 A | 1/1993 | Palma et al. | 372/27 |
| 5,230,004 A | 7/1993 | Nicholson | 372/92 |
| 5,283,796 A | 2/1994 | Fink | |

(List continued on next page.)

FOREIGN PATENT DOCUMENTS

| | | | |
|---|---|---|---|
| WO | 97/34344 | 9/1997 | H01S/3/136 |
| WO | 98/50986 | 11/1998 | H01S/3/08 |

OTHER PUBLICATIONS

K.M. Abramski et al., "Single–Mode Selection Using Coherent Imaging Within a Slab Waveguide CO2 Laser", Appl. Phys. Lett. 60(20), May 18, 1992.

(List continued on next page.)

Primary Examiner—David Porta
Assistant Examiner—Davienne Monbleau
(74) Attorney, Agent, or Firm—Darby & Darby

(57) ABSTRACT

An optical resonator supporting two sets of simultaneously co-existent oscillation modes (30 and 31), having polarizations orthogonal to each other. Mode control elements (28 and 29), such as apertures and phase elements, are introduced into the resonator to allow only preferred modes to exist. The placement and orientation of the sets are designed such that the high intensity zones of one set fall on the nodes or low intensity zones of the other set in an interlaced pattern. Thus, in a laser resonator, better utilization of the gain medium (24) is achieved and the beam quality and brightness over multimode lasing are improved. This configuration improves the performance of high Fresnel number resonators, in both pulsed and continuous lasers, for applications such as scribing, drilling, cutting, target designation and rangefinding. An application of the intra-cavity coherent summation of orthogonally polarized modes is described, whereby azimuthally or radially polarized beams may be obtained.

33 Claims, 9 Drawing Sheets

U.S. PATENT DOCUMENTS

| | | | |
|---|---|---|---|
| 5,412,211 A | | 5/1995 | Knowles |
| 5,473,626 A | * | 12/1995 | Fan et al. .................... 372/105 |
| 5,555,253 A | | 9/1996 | Dixon .......................... 372/29 |
| 5,745,511 A | | 4/1998 | Leger |
| 5,789,748 A | | 8/1998 | Liu |
| 5,917,844 A | * | 6/1999 | Hill ............................. 372/27 |
| 6,021,140 A | | 2/2000 | Clark et al. .................... 372/18 |
| 6,028,869 A | * | 2/2000 | Harada et al. ................ 372/19 |
| 6,292,505 B1 | * | 9/2001 | Takenaka et al. ............. 372/97 |
| 6,459,482 B1 | | 10/2002 | Singh |

OTHER PUBLICATIONS

Ram Oron et al., "Discontinuous Phase Elements for Transverse Mode Selection in Laser Resonators", Applied Physics Letters, vol. 74, No. 10, Mar. 8, 1999.

V.G. Niziev, et al., "Influence of Beam Polarization on Laser Cutting Efficiency", J. Phys. D: Appl. Phys. 32 (1999), 1455–1461.

M.E. Marhic and E. Garmire, "Low–Order TE Operation of a CO2 Laser for Transmission Through Circular Metallic Waveguides", Appl. Phys. Lett. 38, 1981.

Y. Liu, et al., "Vacuum Laser Acceleration Using a Radially Polarized CO2 Laser beam", Nuclear Instruments and Methods in Physics Research A 424 (1999), 296–303.

S. Quabis, et al., "Focusing Light to a Tighter Spot", Optics Communications, 179, pp. 1–7, 2000.

Y. Mushiake, et al., "Generation of Radially Polarized Optical Beam Mode by Laser Oscillation", Proc. IEEE Lett. 60, p. 1107, 1972.

A.A. Tovar, "Production and Propagation of Cylindrically Polarized Laguerre–Gaussian Laser Beams", J. Opt. Soc. Am. A. vol. 15, No. 10, Oct. 1998.

A.V. Nesterov et al., "Generation of High–Power Radially Polarized Beam", J. Phys. D: Appl. Phys. 32 (1999) 2871–2875.

D. Pohl, "Operation of a Ruby Laser in the Purely Transverse Electric Mode TE 01", Appl. Phys. Lett. vol. 20, No. 7, Apr. 1972.

* cited by examiner

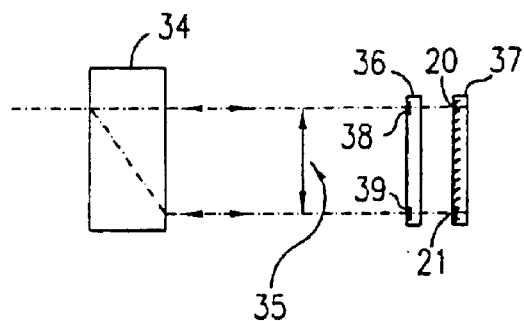
FIG. 4
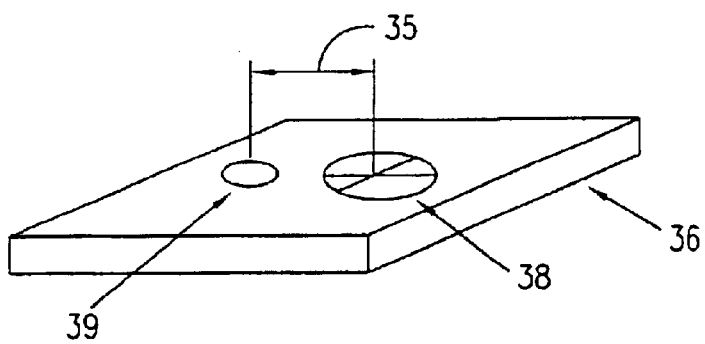
FIG. 5
FIG. 6A 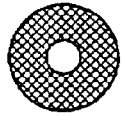  FIG. 6B   FIG. 6C 
FIG. 6D 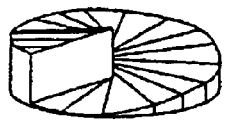  FIG. 6E 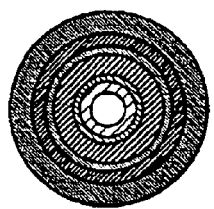
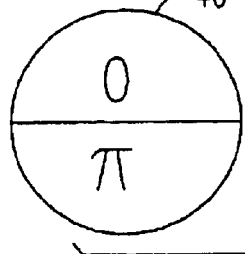 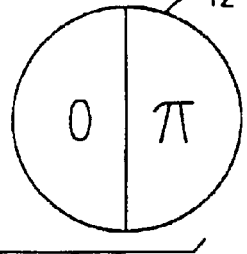
FIG. 7

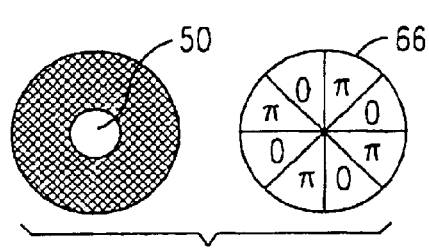
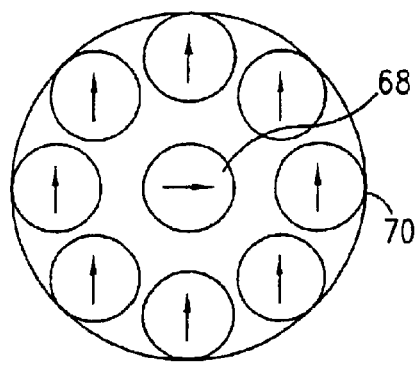
FIG. 13
FIG. 14
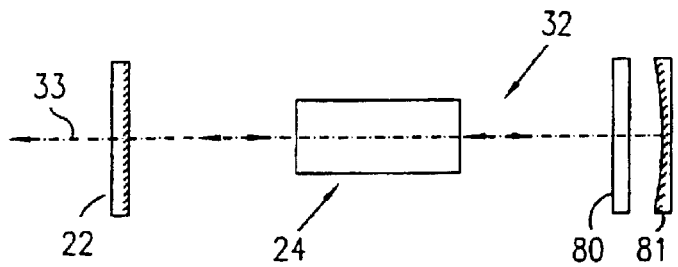
FIG. 15
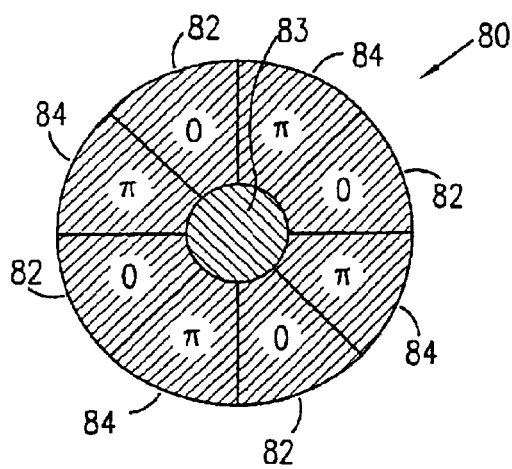
FIG. 16
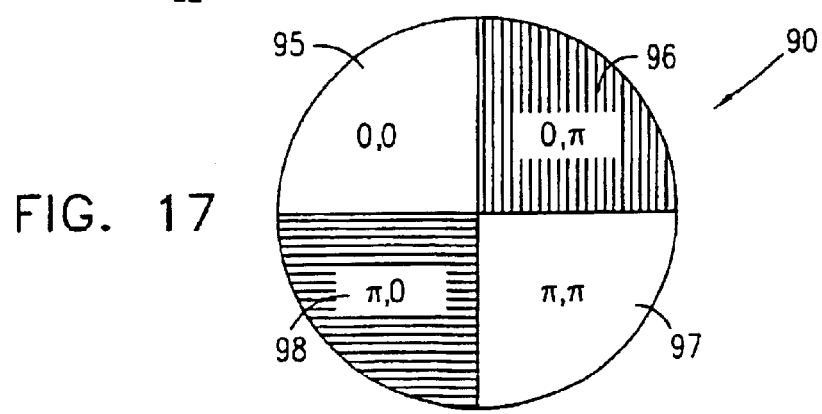
FIG. 17

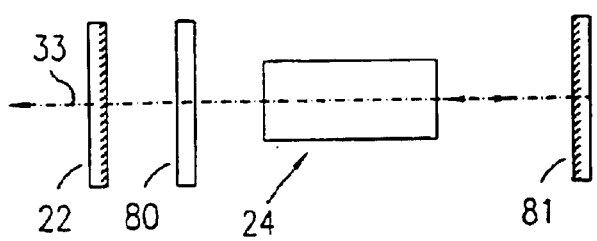
FIG. 18
FIG. 19
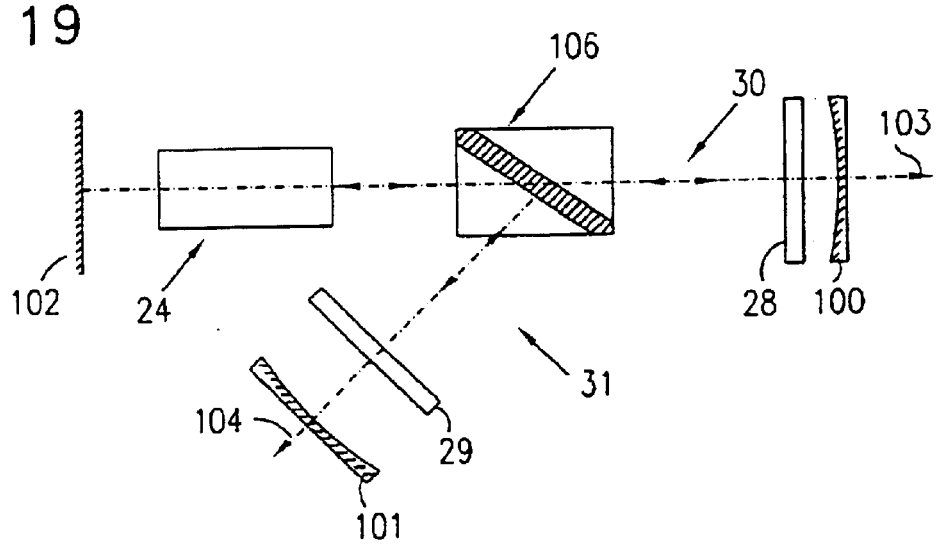
FIG. 20
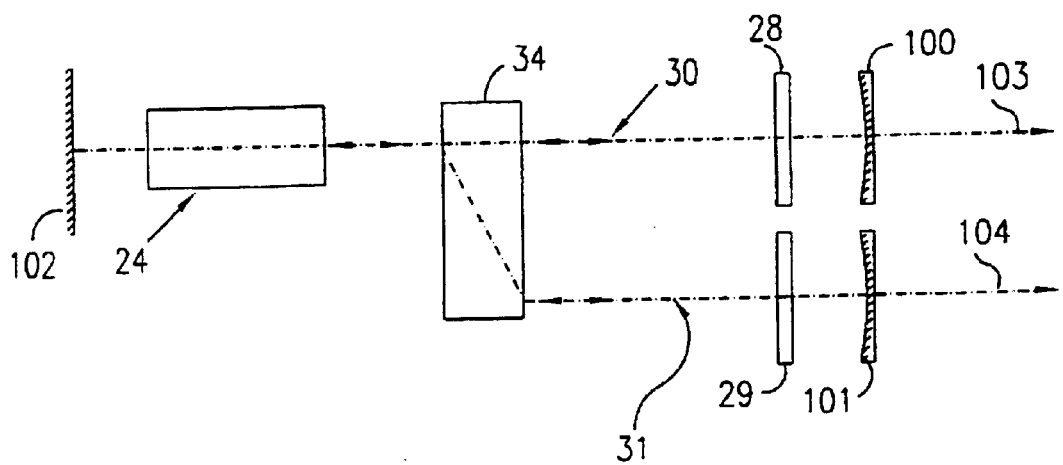

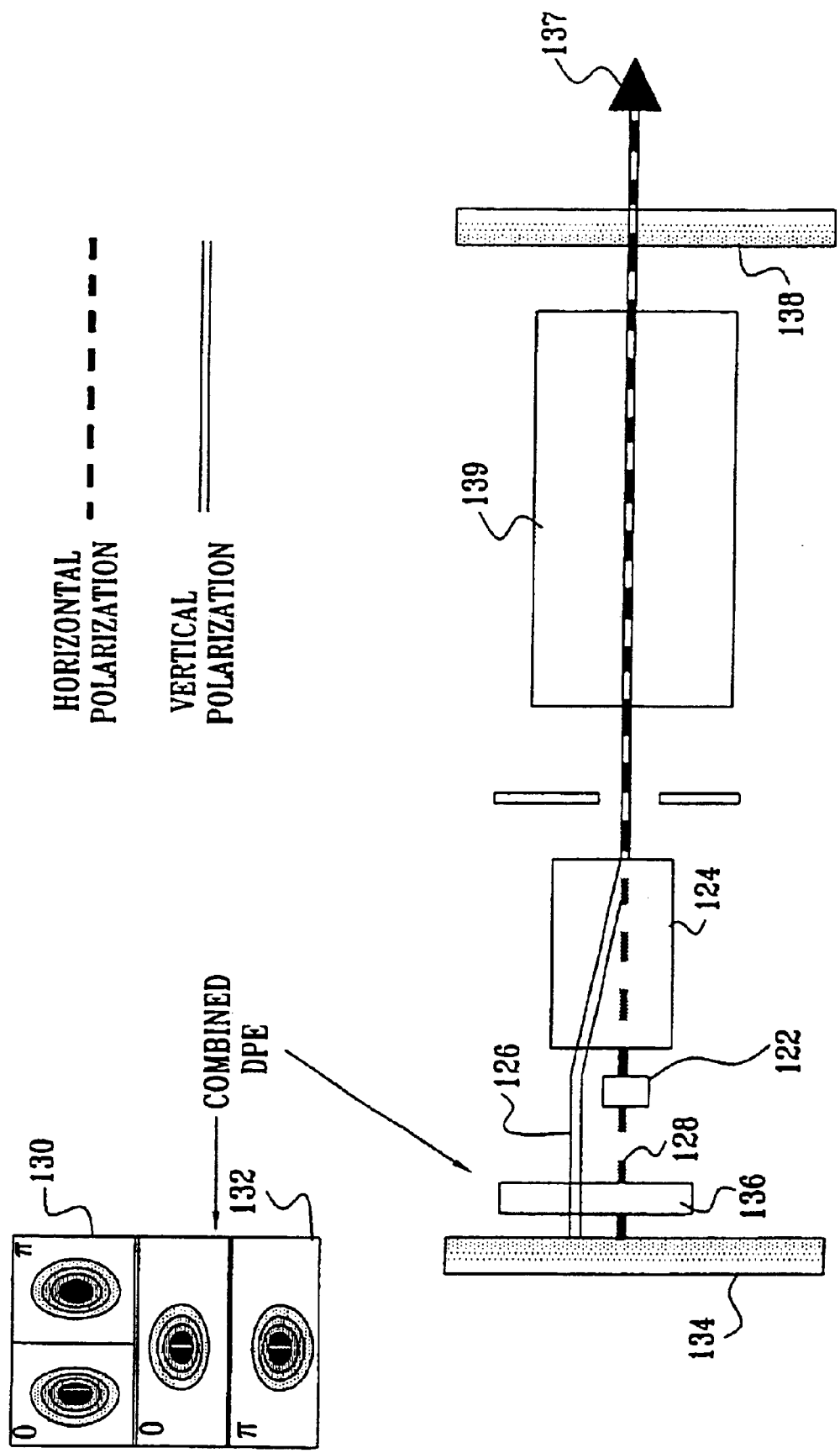

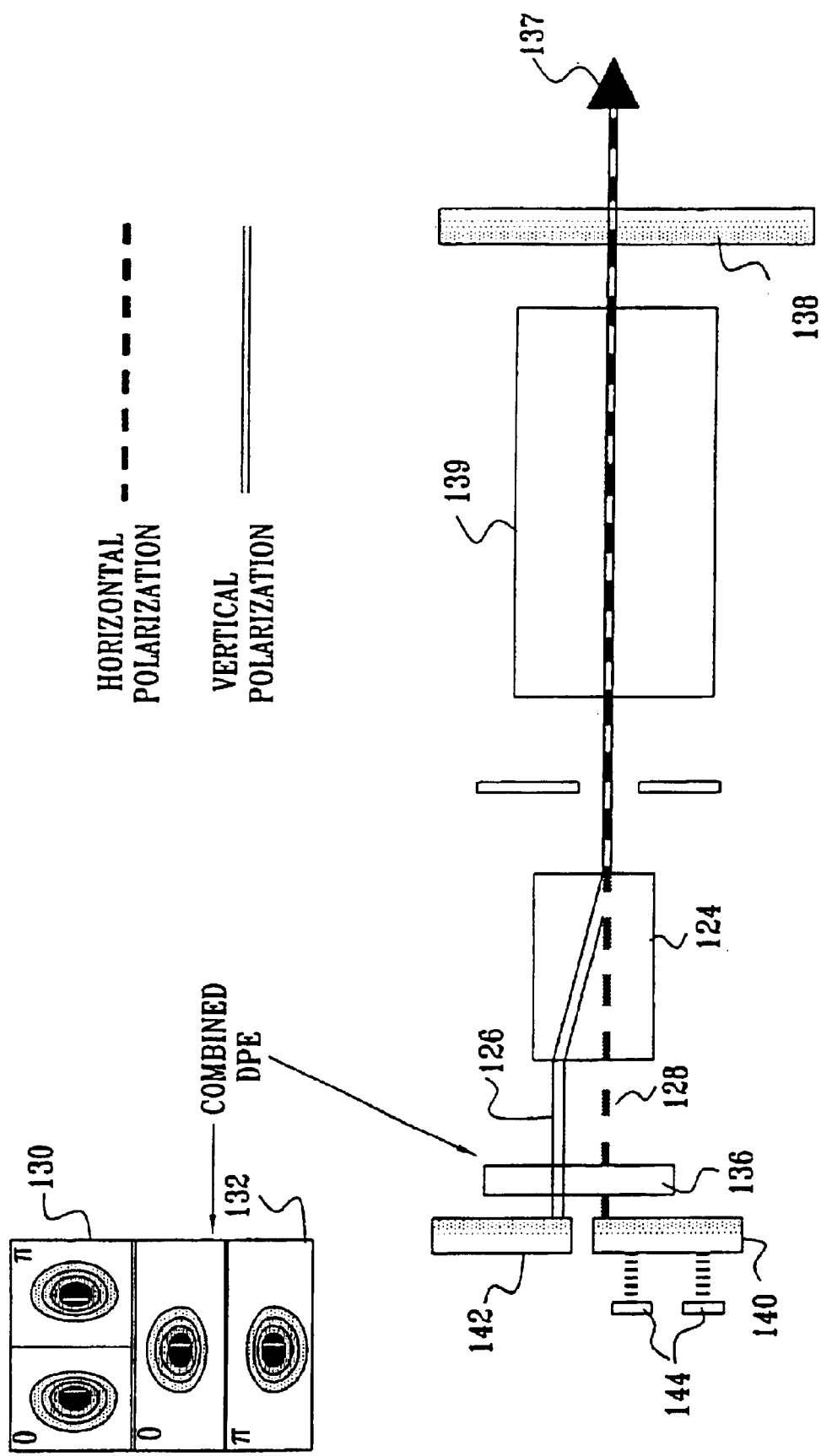

OPTICAL RESONATORS WITH ORTHOGONALLY POLARIZED MODES

This is a continuation of international application Serial No. PCT/IL00/00563, filed Sep. 13, 2000. The entire disclosure of the prior application is hereby incorporated by reference. The international application was published in the English language on Mar. 22, 2001 under International Publication No. WO 01/20732.

FIELD OF THE INVENTION

The present invention relates in general to the field of optical resonators and in particular to those used in lasers.

BACKGROUND OF THE INVENTION

In general, the intensity distribution of light emerging from optical resonators, especially those used in high power lasers with large apertures, has a multimode pattern. In this pattern, the intensity is typically distributed in spots of different sizes, smaller in diameter than the aperture of the resonator. These spots have random phases, and in an unpolarized resonator, have different polarizations. This pattern of spots fills most of the gain medium volume, and thus efficiently extracts the power of the laser. However, the multimode pattern results in an output beam of relatively low brightness, compared to the diffraction limit of the resonator. This low brightness, in turn, limits the usage of the laser beam in many industrial, medical and military applications where a small, well-defined, focused spot or a well collimated beam is needed, such as in scribing, drilling, cutting, target designation and rangefinding.

Ever increasing attempts are being made to design laser resonators which emit a beam of high brightness and high power, i.e. lasing with a single low order mode that fills and utilizes most if not all of the gain medium. This goal is difficult to achieve in a resonator with a high Fresnel number, i.e. with a wide aperture and short length, such as is desired for optimally compact lasers. In these resonators, there is hardly any loss discrimination between the different modes of oscillation and these resonators thus emit high divergence multimode beams. Particular examples of such resonators are those used in CW and pulsed solid state lasers.

A common approach used to control the modes of a resonator is to introduce an aperture inside the resonator. The aperture causes loss to higher order modes thus limiting their oscillation, so they virtually cease to exist. By use of the correct aperture, a laser can be made to emit in the fundamental mode $TEM_{00}$, which possesses the highest brightness of all possible modes. However, in a high Fresnel number resonator, this mode does not fill the entire gain medium diameter, resulting in poor efficiency of the laser.

A number of other methods have been proposed to obtain a specific, stable mode in a large lasing volume. For example, in the article "Single-mode selection using coherent imaging within a slab waveguide $CO_2$ laser" published in Applied Physics Letters, Vol. 60, pp. 2469–2471 (1992), K. M. Abramski, H. J. Baker, A. D. Colly and D. R. Hall propose the insertion of a wire grid into the laser resonator for selecting a specific high order mode. Other methods are reviewed and discussed in the co-pending patent applications "Optical Resonators with Discontinuous Phase Elements", Application No. PCT/IL98/00204, Publication No. WO98/50986 and "Optical Resonators with Spiral Phase Elements" Application No. PCT/JL97/00064, Publication No. WO97/34344. As discussed in the prior art, these methods have some performance limitations, or have some difficulties in practical implementation, such as an inability to sufficiently extract power from the gain medium.

One of the methods proposed in the above-mentioned patent applications has recently been demonstrated by R. Oron et al. in the article "Discontinuous phase elements for transverse mode selection in laser resonators" in Applied Physics Letters, Vol. 74 (10), pp. 1373–1375, (1999). In this article, a method is described for causing a resonator to oscillate in a single mode, which need not necessarily be the fundamental $TEM_{00}$ mode. This method involves introduction of phase elements, either discontinuous or continuous, into the resonator. The phase distribution of the phase elements impose different losses to different modes, thus discriminating between them, since only the mode with a phase distribution that matches that of the element suffers no loss. Since the phase element makes changes only to the phase of the radiation field within the cavity, it does not introduce extra loss to the resonator, unlike discriminators that modulate the amplitude such as apertures, wires, apodizers and the like.

The resulting single high order mode distribution, in contrast to a multimode distribution, has a controlled phase, and thus is more easily focusable. In addition, since the high order mode is larger in diameter than the fundamental mode, it more fully fills the gain medium diameter, resulting in higher resonator efficiency and an output beam of higher power.

Yet, the single high-order mode still does not utilize the entire gain medium volume, since modes of order higher than the fundamental mode have both zero intensity zones (nodes) and low intensity regions. In these regions, the electromagnetic field does not create stimulated emission which is the mechanism for extracting power from the lasing medium.

There therefore exists a serious need for a method of operating the resonator of a laser more efficiently, so as to effectively utilize a larger part of the lasing medium.

The disclosures of all publications mentioned in this section and in the other sections of the specification, are hereby incorporated by reference, each in its entirety.

SUMMARY OF THE INVENTION

The present invention seeks to provide an improved optical resonator of higher efficiency than previously available, together with an output beam of high brightness.

There is thus provided in accordance with a preferred embodiment of the present invention, an optical resonator with reflector elements at its extremities. Between the reflecting elements are disposed at least one polarizing element and at least two mode-controlling elements, each mode controlling element selectively presenting high attenuation to all but one mode, whether the fundamental mode or one of higher order. At least one of the reflecting elements may be a full reflector, and another a partially transmitting reflector operating as an output coupler.

The resonator may be an active optical resonator, as embodied in a laser, such as a linear laser or a ring laser, or a passive optical resonator. Also, the resonator may be a stable or unstable resonator. Each of the mode-controlling elements may be a separate element or may be embodied in at least one reflector or output coupler, or may be positioned adjacent to an optical element The invention, according to a preferred embodiment, operates in the following way. The polarizing element separates the two orthogonal polarizations of the beams propagating inside the resonator, such that a beam possessing one polarization propagates along one path and the beam with the orthogonal polarization propagates along another path. The two paths can be at an angle to each other, or parallel to each other but laterally displaced. Within the resonator there exists a common path for the two polarizations, and the gain medium is placed in this path. Each separate path together with the common path constitutes an independent resonator. In each of the separate paths the mode structure is controlled with any of the known methods for controlling modes, such as by means of apertures, phase elements, wires, apodizers, conical mirrors, diffractive elements and the like. Generally, the electromagnetic fields of the resonator beams do not directly interact in the common path because of the orthogonal polarizations and the random phase differences of the beams. However, they do interact indirectly in the gain medium through the depletion of the gain by the electromagnetic field of the beams. Specifically, the gain of any region utilized by one of the beams is no longer available for utilization by the other beam.

Each of the modes has a region or regions or lobes of high intensity, and a region or regions or nodes of effectively zero or low intensity. Stable co-existence of two beams in the gain medium occurs when the mode control elements, one in each path, are designed and axially aligned in such a way that, within the gain medium, the region or regions of higher intensity of one mode fall on the lower intensity region or regions of the other mode. In this way the perturbation of one mode on the other via the gain medium is minimal.

On the other hand, because of the gain depletion mechanism, one mode acts effectively as a loss element to the other mode, thus limiting the onset of any modes other than the desired complementary polarized mode. In this way, undesired higher order uncontrolled modes are effectively eliminated. The two modes co-exist in equilibrium, complementing each other in the gain medium, and thus utilize a larger gain volume than a single mode would have utilized. The effective result is the ability to achieve utilization levels of the gain medium typical of multimode resonators, while at the same time maintaining the brightness typical of low order modes of the resonator.

Gain depletion can be utilized in a further preferred embodiment of the invention, whereby only a single mode control element is used in the resonator. This element defines the mode selectively excited in one polarization direction. The effect of the gain depletion is that other modes of the same polarization cannot freely exist in the resonator, because of the overlap and interference of the fields with the first mode selected by the mode control element. On the other hand, a second mode with orthogonal polarization can exist, on condition that the structure of this second mode is such that its regions of high intensity do not fall on the regions of the gain medium which have already been utilized by the regions of high intensity of the first mode. In this manner, the second orthogonal mode is naturally selected, without the necessity of a second mode control element, by the geometry of the resonator itself and by the geometry of the regions of the gain medium not utilized by the first mode.

According to further preferred embodiments of the invention, each of the mode control elements in the two paths can be such as to allow the existence of a set of modes rather than a single mode, each of the modes of the set having the same polarization. Thus, according to further preferred embodiments of the invention, there can respectively exist in the two paths of the resonator either two single modes of orthogonal polarization, or a single mode and a set of modes of orthogonal polarization, or two sets of modes, each set having polarization orthogonal to the other set. Throughout this specification, and in the claims, the use of the term "mode" and the term "set of modes", are used alternatively and equivalently, unless specifically indicated otherwise. If the mode control elements are such as to ensure that each beam essentially has only a single mode, the resultant output has a well-defined and controlled phase, low divergence and high brightness, as well as resulting from a high level of utilization of the gain medium.

The resultant output beam is generally extracted from the resonator by means of an output coupler, which may or may not be placed in the common path. The output beam has two orthogonal well-defined polarizations. In order to focus the output beam with conventional non-polarizing optics to a small focal spot for various applications, another phase element is preferably introduced outside the resonator to adjust the phase of the beam such that all the lobes of the beam have the same phase sign.

According to another preferred embodiment of the present invention, two output couplers can be provided, one in each of the resonator paths. By this means, two output beams with orthogonal polarizations are obtained from the resonator, each beam being associated with a different mode or set of modes.

According to yet another preferred embodiment of the present invention, both the polarizing element and the reflector elements are unified onto the same element. This unified element introduces a different phase shift for different polarizations thus controlling the modes independently in the two polarizations. In this preferred embodiment, the two paths of the resonator, one for each polarization, are degenerated into one.

Thus, in accordance with the above preferred embodiments, a stable combination of low order modes can be achieved in a large-aperture, short resonator possessing high brightness with high efficiency power extraction from the lasing medium.

According to yet further preferred embodiments of the present invention, intra-cavity coherent summation or superposition of two orthogonally polarized modes, or sets of modes, can be utilized to obtain specific polarization arrangements, which may be difficult to obtain by other methods. A particularly useful application of this preferred embodiment is the case when orthogonal $TEM_{01}$ modes within the laser cavity are coherently combined to obtain almost pure, azimuthally or radially polarized beams.

Such beams are particularly useful in a number of laser applications, such as material processing, as described by V. G. Niziev and A. V. Nesterov, in J. Phys. D, 32, p.1455 (1999), light propagation in hollow fibers, as described by M. E. Marhic and E. Garmire, in Appl. Phys. Lett. 38, p.743 (1981), the trapping and accelerating of particles as described by Y. Liu et al., Nuci. Instrum. Methods, A424, p296 (1999), and focusing with high numerical aperture lenses, as described in S. Quabis et al., in Opt. Commun. 179, 1 (2000). Such polarizations have been previously obtained by combining two linearly polarized laser output beams interferometrically, or by transmitting a linear polarized laser beam through a twisted nematic liquid crystal. These methods have relatively low light throughput efficiency or are cumbersome to perform.

Other methods for obtaining azimuthal or radial polarizations, that potentially could have higher efficiencies, involve the insertion of specially designed elements into the laser resonator. Some such methods have been investigated in the past, but all have certain difficulties. In one example, radially polarized beams were obtained using conical elements, but the method involved difficult and impractical, refractive index matching techniques, as described in Y. Mushiake, et al., in Proc. IEEE Lett. 60, p.1107 (1972). Complex Brewster-type windows have also been proposed for forming azimuthally polarized beams, such as described in A. A. Tovar, J. Opt. Soc. Am. A, 15, p.2705 (1998), but such windows are difficult to realize in practice. Polarization selective mirrors have been incorporated into high power lasers to form radially polarized beams, as described in A. V. Nesterov, et al., J. Phys. D, 32, p.2871 (1999), but the polarization purity is relatively poor. Also, radially polarized beams have been formed by combining a calcite crystal with a telescope configuration, as described in D. Pohl, Appl. Phys. Lett. 20, p.266 (1972), but this typically resulted in low discrimination between the polarizations, so that the laser could operate only close to regions of instability.

In the intra-cavity coherent summation or superposition of modes, the selection of the modes is performed, as in the previously described non-coherent that allow for significant mode discrimination, such as the optical mode control elements described hereinabove, or the discontinuous phase elements described in the article by R. Oron, op. cit. Additionally, a phase adjusting element is inserted into the beam path of one of the orthogonally polarized modes to obtain a defined phase difference between them. The resulting modes are thus correctly combined. The correct combination is obtained, according to this embodiment of the present invention, by adjusting the mutual phase of the two modes until the correct coherent summation is obtained, as is preferably observed on the mode outputs themselves. It should be noted that the terms summation and superposition are used interchangeably in this application.

In accordance with yet another preferred embodiment of the present invention, there is provided an optical resonator consisting of reflectors, one or more polarizing elements, and one or more optical mode control elements, operative such that there exist in the resonator simultaneously, first and second sets of modes with orthogonal polarizations, each of the set of modes having one or more regions of higher intensity and one or more regions of lower intensity, and wherein there is essentially spatial coincidence of the one or more regions of higher intensity of the first set of modes and the one or more regions of lower intensity of the second set of modes.

There is further provided in accordance with yet another preferred embodiment of the present invention, an optical resonator as described above, and wherein one or more of the first and second sets of modes consists of a single mode, which could be the $TEM_{00}$ mode of the resonator.

In accordance with still another preferred embodiment of the present invention, there is provided an optical resonator as described above, and wherein each of the one or more optical mode control elements is operative to attenuate all but one predetermined set of modes.

There is further provided in accordance with still another preferred embodiment of the present invention, an optical resonator as described above, and also consisting of a first and a second path, and wherein the polarizing element is operative such that radiation or the first set of modes with a first polarization passes along the first path of the resonator, and radiation of the second set of modes with a second polarization orthogonal to the first polarization, passes along the second path of the resonator, at least one of the paths consisting of one of the optical mode control elements, such that each of the paths supports a different one of the first and second sets of modes.

In accordance with further preferred embodiments of the present invention, there is also provided an optical resonator as described above, and wherein the resonator is an active or a passive resonator.

There is provided in accordance with yet a further preferred embodiment of the present invention, an optical resonator as described above, and also consisting of a gain medium located in a common path, through which passes the radiation of the first set of modes with a first polarization and the radiation of the second set of modes with a second polarization.

There is even further provided in accordance with a preferred embodiment of the present invention, an optical resonator as described above, and also consisting of two partial reflectors arranged such that two output beams are obtained from the cavity.

Furthermore, in accordance with yet another preferred embodiment of the present invention, there is provided an optical resonator as described above and wherein one of the polarizing elements and one of the mode control elements are unified.

There is also provided in accordance with further preferred embodiments of the present invention, an optical resonator as described above, and wherein the first and the second paths are at an angle to each other or parallel to each other.

In accordance with yet more preferred embodiments of the present invention, there is provided an optical resonator as described above, and wherein the polarizing element is a beam splitter, a birefringent crystal, or a thin film polarizer.

There is further provided in accordance with yet other preferred embodiments of the present invention, an optical resonator as described above, and wherein one or more of the mode control elements is a discontinuous or continuous phase element, a spatial amplitude modulation element, or is a reflective, diffractive or transmissive element.

In accordance with still another preferred embodiment of the present invention, there is provided an optical resonator as described above, and wherein the polarizing element has a subwavelength pattern.

There is further provided in accordance with still another preferred embodiment of the present invention, an optical resonator as described above and wherein the mode control elements are combined on the same physical optical element.

In accordance with further preferred embodiments of the present invention, there is also provided an optical resonator as described above, and being a ring optical resonator or an unstable optical resonator.

There is provided in accordance with yet a further preferred embodiment of the present invention, an optical resonator as described above, and wherein the reflectors have radii of curvature different from each other.

There is even further provided in accordance with preferred embodiments of the present invention, an optical resonator as described above, and wherein the polarizing element is made of calcite, $YVO_4$ or $\alpha$-BBO.

Furthermore, in accordance with yet more preferred embodiments of the present invention, there is provided an optical resonator as described above and wherein the first set of modes with a first polarization is a $TEM_{00}$ mode and the second set of modes with a second polarization is a $TEM_{02}$ mode, or a $TEM_{01*}$ mode, or a $TEM_{04}$ mode, or a super-Gaussian mode.

There is also provided in accordance with a further preferred embodiment of the present invention, an optical resonator as described above and wherein both sets of modes are $TEM_{01}$ modes.

In accordance with yet another preferred embodiment of the present invention, there is provided an optical resonator as described above and wherein the first set of modes with the first polarization consists of $TEM_{00}$ and $TEM_{04}$ modes, and the second set of modes with the second polarization is a $TEM_{04}$ mode.

There is further provided in accordance with yet another preferred embodiment of the present invention a laser consisting of an optical resonator consisting of a gain medium, the resonator supporting a first and a second set of orthogonally polarized modes, each of the set of modes having one or more regions of higher intensity and one or more regions of lower intensity.

In accordance with still another preferred embodiment of the present invention, there is provided a laser as described above, and wherein one or more of the first and second sets of modes consists of a single mode.

There is further provided in accordance with still another preferred embodiment of the present invention a laser as described above, and wherein the first and the second set of modes are orthogonally polarized such that the gain medium is utilized by both of the sets of modes simultaneously.

In accordance with a further preferred embodiment of the present invention, there is also provided a laser as described above, and wherein the first and second sets of modes are arranged such that the one or more regions of higher intensity of the first set of modes and the one or more regions of lower intensity of the second set of modes are essentially spatially coincident, such that the gain medium is utilized by both of the sets of modes simultaneously.

There is provided in accordance with yet a further preferred embodiment of the present invention a method of simultaneously increasing the gain volume utilization of a laser consisting of a resonator with a gain medium, while at the same time maintaining the brightness typical of low order modes, consisting of the steps of providing one or more polarizing elements, and providing one or more optical mode control elements, such that the resonator supports simultaneously first and second sets of modes, each of the sets of modes having one or more regions of higher intensity and one or more regions of lower intensity.

There is even further provided in accordance with a preferred embodiment of the present invention, a method of simultaneously increasing the gain volume utilization of a laser while maintaining the brightness typical of low order modes, as described above, and also consisting of the step of arranging the one or more optical mode control elements such that there is essentially spatial coincidence of the one or more regions of higher intensity of the first set of modes and the one or more regions of lower intensity of the second set of modes, so that the volume of the gain medium is effectively utilized by both of the sets of modes simultaneously.

Furthermore, in accordance with yet another preferred embodiment of the present invention, there is provided a method of simultaneously increasing the gain volume utilization of a laser while maintaining the brightness typical of low order modes, as described above, and also consisting of the step of arranging the polarizing element such that the first set of modes and the second set of modes have orthogonal polarizations, so that the volume of the gain medium is effectively utilized by both of the sets of modes simultaneously.

There is also provided in accordance with a further preferred embodiment of the present invention, a method of simultaneously increasing the gain volume utilization of a laser while maintaining the brightness typical of low order modes, as described above, and wherein one or more of the first and second sets of modes consists of a single mode.

In accordance with yet another preferred embodiment of the present invention, there is provided an optical resonator consisting of reflectors, at least one polarizing element operative to direct radiation with orthogonal polarizations along first and second paths in the resonator, and to recombine radiation with orthogonal polarizations from the first and second paths, at least one optical mode control element such that there exist in the resonator simultaneously first and second sets of modes with orthogonal polarization, and at least one phase adjustment element disposed in at least one of the first and second paths, operative to adjust the mutual phase of the first and second sets of modes, such that the modes are summed coherently.

There is further provided in accordance with yet another preferred embodiment of the present invention, an optical resonator as described above wherein the at least one optical mode control element consists of two optical mode control elements.

In accordance with still another preferred embodiment of the present invention, there is provided an optical resonator as described above, and wherein at least one of the first and second sets of modes consists of a single mode, which furthermore may be an essentially $TEM_{01}$ mode of the resonator.

There is further provided in accordance with still another preferred embodiment of the present invention, an optical resonator as described above, and wherein the first mode is a vertically polarized $TEM_{01(hor)}$ mode, and the second mode is a horizontally polarized $TEM_{01(ver)}$ mode, and wherein the at least one phase element is adjusted such that the coherent summation of the modes generates an azimuthally polarized beam.

In accordance with a further preferred embodiment of the present invention, there is also provided an optical resonator as described above, and wherein the first mode is a horizontally polarized $TEM_{01(hor)}$ mode, and the second mode is a vertically polarized $TEM_{01(ver)}$ mode, and wherein the at least one phase element is adjusted such that the coherent summation of the modes generates a radially polarized beam.

There is provided in accordance with yet further preferred embodiments of the present invention an optical resonator as described above, and wherein the at least one phase adjustment element is a transmissive plate whose angular orientation in the at least one path is adjustable, or a material whose refractive index is controlled by application of an electric field, or an end mirror whose longitudinal position may be adjusted.

There is even further provided in accordance with a preferred embodiment of the present invention an optical resonator as described above, and wherein the position of the end mirror is adjusted by means of a device such as a piezoelectric device, a motion device actuated by heat expansion, a pressure dependent device, a magnetostrictive device or a linear stepping motor.

There is also provided in accordance with a preferred embodiment of the present invention, an optical resonator as described above, and also comprising a gain medium.

Furthermore, in accordance with yet another preferred embodiment of the present invention, there is provided a laser consisting of an optical resonator and a gain medium, the resonator supporting a first and a second set of orthogonally polarized modes, whose mutual phase is adjusted such that the modes are summed coherently within the resonator.

There is also provided in accordance with a further preferred embodiment of the present invention a laser as described above, and wherein at least one of the first and second sets of modes consists of a single mode, which furthermore may be an essentially $TEM_{01}$ mode of the resonator.

In accordance with yet another preferred embodiment of the present invention, there is provided a laser as described above, and wherein the first mode is a vertically polarized $TEM_{01(hor)}$ mode, and the second mode is a horizontally polarized $TEM_{01(ver)}$ mode, and whose mutual phase is adjusted such that the coherent summation of the modes generates an azimuthally polarized beam.

There is further provided in accordance with yet another preferred embodiment of the present invention a laser as described above, and wherein the first mode is a horizontally polarized $TEM_{01(hor)}$ mode, and the second mode is a vertically polarized $TEM_{01(ver)}$ mode, and whose mutual phase is adjusted such that the coherent summation of the modes generates a radially polarized beam.

In accordance with still another preferred embodiment of the present invention, there is provided a method of intracavity coherent summation of two orthogonally polarized beams, consisting of the steps of providing at least one polarizing element operative to direct radiation with orthogonal polarizations along first and second paths in the cavity, and to recombine radiation with orthogonal polarizations from the first and second paths, providing at least one optical mode control element such that there exist in the resonator simultaneously first and second sets of modes with orthogonal polarization, and providing at least one phase adjustment element disposed in at least one of the first and second paths, operative to adjust the mutual phase of the first and second sets of modes, such that the modes are summed coherently.

There is further provided in accordance with still another preferred embodiment of the present invention a method as described above, wherein the at least one optical mode control element consists of two optical mode control elements.

In the method described above, at least one of the first and second sets of modes may consist of a single mode, which furthermore could be an essentially $TEM_{01}$ mode of the resonator.

There is provided in accordance with yet a further preferred embodiment of the present invention a method as described above, and wherein the first mode is a vertically polarized $TEM_{01(hor)}$ mode, and the second mode is a horizontally polarized $TEM_{01(ver)}$ mode, and also consisting of the step of adjusting the phase adjustment element such that the coherent summation of the modes generates an azimuthally polarized beam.

Furthermore, in accordance with yet another preferred embodiment of the present invention, there is provided a method as described above, and wherein the first mode is a horizontally polarized $TEM_{01(hor)}$ mode, and the second mode is a vertically polarized $TEM_{01(ver)}$ mode, and also consisting of the step of adjusting the phase adjustment element such that the coherent summation of the modes generates a radially polarized beam.

BRIEF DESCRIPTION OF THE DRAWINGS

The present invention will be understood and appreciated more fully from the following detailed description taken in conjunction with the drawings in which:

FIG. 4 is a schematic illustration of another preferred embodiment of the beam displacer, mode control elements and reflectors used in the resonator of FIG. 3 and wherein the mode control elements and reflectors are each implemented on the same physical component;

FIG. 5 is a schematic illustration of a preferred embodiment of a combined beam-controlling element shown in FIG. 4;

FIGS. 6A to 6E are schematic illustrations of mode controlling elements according to different preferred embodiments of the present invention; FIG. 6A is an aperture designed to select the $TEM_{00}$ mode; FIG. 6B is a wire cross, to select the $TEM_{02}$ mode; FIG. 6C is a discontinuous phase element designed to select the $TEM_{02}$ mode; FIG. 6D is a continuous phase element designed to select the $TEM_{01*}$ mode; and FIG. 6E is an absorptive apodizer designed to select a super-Gaussian mode;

FIG. 7 is a schematic illustration of a pair of mode selective phase elements and their relative orientation, designed and operative to select a combination of $TEM_{01}$ modes;

FIG. 13 is a schematic illustration of an aperture and a mode selective phase element according to a preferred embodiment of the present invention, designed and operative to select the $TEM_{00}$ and $TEM_{04}$ modes respectively;

FIG. 14 is a schematic view of the near-field intensity distribution and relative polarizations of the modes of the resonator of FIG. 1 or FIG. 3 using the mode selective elements of FIG. 13;

FIG. 15 is a schematic illustration of a resonator of a laser constructed and operative in accordance with a preferred embodiment of the present invention, with a unified polarizing and mode control element introduced close to the full reflector;

FIG. 16 is a schematic illustration of a unified polarizing and mode control phase element according to a preferred embodiment of the present invention, constructed and operative to select a $TEM_{00}$ mode and a $TEM_{04}$ mode with orthogonal polarizations;

FIG. 17 is a schematic illustration of a unified polarizing and mode control phase element, for selecting a combination of two orthogonally polarized $TEM_{01}$ modes;

FIG. 18 is a schematic illustration of a resonator of a laser constructed and operative in accordance with a preferred embodiment of the present invention, with a unified polarizing and mode control element introduced close to the output coupling reflector;

FIG. 19 is a schematic illustration of a laser resonator constructed and operative in accordance with another preferred embodiment of the present invention with a polarizing beam splitter, and having two orthogonally polarized output beams, each emerging from an output coupling reflector;

FIG. 20 is a schematic illustration of a laser resonator constructed and operative in accordance with another preferred embodiment of the present invention incorporating a polarizing birefringent beam displacer, and having two orthogonally polarized output beams, each emerging from an output coupling reflector;

FIG. 23A is a schematic drawing of a laser resonator configuration, in which specific transverse modes are selected and coherently summed. This configuration is similar to that shown in FIG. 4, but with the addition of a phase adjusting element in one path of the laser; and FIG. 23B is a schematic drawing of another laser resonator configuration, according to yet another preferred embodiment of the present invention, in which specific transverse modes are selected and coherently summed. This configuration is similar to that shown in FIG. 23A, but differs in that the phase adjustment is performed by changing the length of one of the resonator paths by moving its end mirror.

DETAILED DESCRIPTION OF PREFERRED EMBODIMENTS

Figure 1:
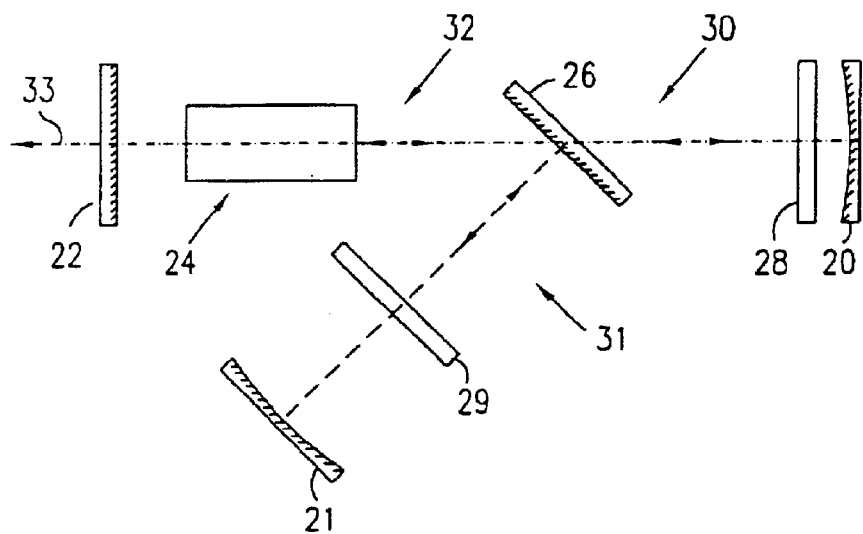
FIG. 1 is a schematic illustration of a linear resonator of a laser constructed and operative in accordance with a preferred embodiment of the present invention, with a thin film polarizing beam splitter.

Reference is now made to FIG. 1, which is schematic illustration of a linear resonator of a laser constructed and operative in accordance with a preferred embodiment of the present invention. The linear resonator preferably consists of reflectors, preferably full reflectors 20 and 21 and a partial reflector or an output coupler 22, a gain medium 24, a thin film polarizing beam splitter 26 and two mode controlling elements 28 and 29. The beam splitter 26 reflects one polarization, hereinafter called polarization "1", through control element 29 towards full reflector 21, and transmits the polarization orthogonal to polarization "1", hereafter called polarization "2". Two modes of oscillation, indicated by reference numbers 30 and 31 are thus established between the output coupler 22 and the reflectors 20 and 21 respectively. Both radiation associated with both modes 30 and 31 propagate through the gain medium 24. However, the radiation associated with mode 30 propagates through the mode controlling element 28 while that of mode 31 propagates through the mode controlling element 29.

In accordance with a preferred embodiment of the invention, the laser resonator of FIG. 1 is characterized in that the elements 28 and 29 are operative to select modes 30 and 31 respectively such that they have different intensity and phase distributions, and element 26 is operative to provide that mode 30 has polarization "2" while mode 31 has polarization "1". Elements 28 and 29 are designed and oriented in such a way that the high intensity regions or lobes of mode 30 in the gain medium 24 fall on the nodes or low intensity regions of mode 31, and vice versa. Since modes 30 and 31 interact in the gain medium 24 only through the gain depletion which each one introduces, they can co-exist stably in the resonators. Other undesirable modes are suppressed by the mode controlling elements, thereby improving the quality of the output beam 33.

There are a number of alternative preferred optical configurations of such linear resonators. The output coupler and full reflectors, 20, 21 and 22, may have surfaces of different radii of curvature, whether concave or convex, or may even be flat. The amount of curvature can be designed so as to compensate for the thermal lensing of the gain medium, particularly in solid state lasers. Furthermore, any of the end reflectors may be Porro prisms, phase conjugate mirrors, or any other type of appropriate reflector. In the preferred embodiment of FIG. 1, reflectors 20 and 21 need not be identical. Furthermore, provided the resonators formed by the elements 22, 26, 29, 21 and 22, 26, 28, 20 are designed in such a way that each correctly supports the respective modes 31 and 30 independently, with compensation for the thermal lensing of gain medium 24, the distances between the polarizing beam splitter 26 and the reflectors 20, 21, need not be identical. In fact, since each of the nodes 30 and 31 generally occupies a separate portion of the gain medium 24, because of the different influence of the thermal distribution in the gain medium 24 on the distortion of the two modes, optimum performance is generally reached when the two resonators are different in design.

Figure 2:
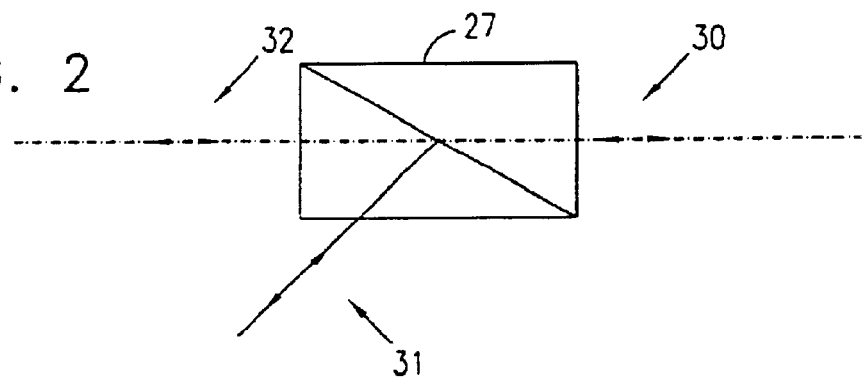
FIG. 2 shows a birefringent prism polarizing beam splitter for use in the resonator of FIG. 1, instead of the thin film polarizing beam splitter.

FIG. 2 is a schematic illustration of another preferred alternative to the thin film polarizing beam splitter shown in FIG. 1, and is constructed, of a birefringent prism 27, such as a "Glan-Thompson" or "Glan-Laser" type of prism.

Figure 3:
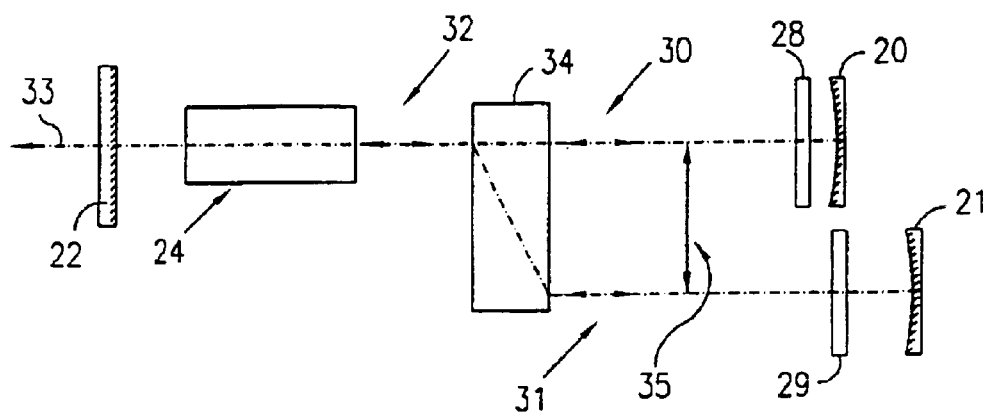
FIG. 3 is a schematic illustration of a resonator of a laser constructed and operative in accordance with a preferred embodiment of the present invention with a birefringent lateral beam displacer, separate mode control elements and separate reflectors.

Reference is now made to FIG. 3, which is a schematic illustration of another preferred embodiment of the present invention. The beam splitter 26 of the embodiment of FIG. 1 is replaced by a polarizing beam displacer 34. The beam displacer 34 transmits one polarization, polarization "1", without any displacement, and transmits the polarization orthogonal to polarization "1", polarization "2", with a lateral displacement 35 of its line of propagation. The beam displacer is constructed of a birefringent material, preferably calcite, $YVO_4$ or α-BBO.

Two modes of oscillation, indicated by reference numbers 30 and 31 are established between the output coupler 22 and the reflectors 20 and 21 respectively. The energy of both modes 30 and 31 propagate through the gain medium 24. In a similar manner to the configuration of FIG. 1, the energy of mode 30 propagates through the mode-controlling element 28, while that of mode 31 propagates through the mode-controlling element 29.

In accordance with this preferred embodiment of the invention, the laser resonator of FIG. 3 is characterized and operative in the same way as the embodiment of FIG. 1, except that the resonator comprised of the elements 22, 34, 29, 21 is not folded. The section 34, 29, 21 is displaced laterally with respect to the section 34, 28, 20 instead of being at an angle to it. This alternative preferred embodiment is more compact than that of FIG. 1, and also has the advantages that the elements 28 and 29, and the reflectors 20 and 21 can be respectively combined, each pair on the same physical piece of optics.

Such an embodiment, with the two mode control elements on a single component, and the two end reflectors on another single component is shown in FIG. 4. The mode control elements 38, 39 are constructed on the same physical element 36, and also the reflectors 20, 21, on another single physical element 37. In the embodiment shown in FIG. 4., the reflectors 20 and 21 are preferably flat, but the element 37 could also be preferably constructed using a technique such as diamond tuning, whereby the reflectors 20 and 21 could be given any suitable radius of curvature.

FIG. 5 is an example of a combined mode control element constructed on a single piece of optics 36. Pattern 38 is an etched or deposited phase pattern designed and operative to select the mode $TEM_{02}$, while the aperture 39 is designed and operative to select the $TEM_{00}$ mode. The centers of the pattern 38 and the aperture 39 are displaced by the distance 35, which is the exact displacement created by the polarizing beam displacer element 34.

Reference is now made to FIGS. 6A to 6E, which present schematic illustrations of different preferred mode controlling elements.

FIG. 6A illustrates an element in the form of an aperture designed to select the $TEM_{00}$ mode. The aperture introduces loss to all modes higher than the $TEM_{00}$ mode. It can be drilled or etched into a substrate. Generally, when such an aperture is introduced as the sole mode-limiting element into a high power laser resonator, the aperture tends to suffer damage at its edges. It is therefore preferably made of a high damage resistant materials such as Molybdenum or ceramic materials. However, when such an aperture is introduced in conjunction with other mode selectors, into the resonators of the present invention, such as those illustrated in FIG. 1 or FIG. 3, the other mode selectors too are operative in confining the mode $TEM_{00}$ thus effectively preventing or significantly reducing damage to the aperture.

FIG. 6B illustrates an element in the form of a cross made of thin wires designed and operative to select the $TEM_{02}$ mode and higher modes. It introduces losses in the resonator to the $TEM_{00}$ and the $TEM_{01}$ modes, thus preventing their oscillation. In high power lasers, however, the wires are worn out by damage caused by the laser radiation.

FIG. 6C illustrates an element in the form of a discontinuous phase element designed and operative to select the $TEM_{02}$ mode. Since this element does not introduce amplitude loss, and its phase pattern matches that of the $TEM_{02}$ mode, it prevents lasing of both higher order and lower order modes. The element can preferably be etched or deposited on any transparent optical material such as fused silica, glass, zinc selenide, or the like.

FIG. 6D illustrates an element in the form of a spiral continuous phase element designed and operative to select the $TEM_{01*}$ mode.

FIG. 6E illustrates an element in the form of an absorptive apodizer designed and operative to select a super-Gaussian mode.

FIG. 7 is a schematic illustration of an example of an element consisting of a combination of two discontinuous phase elements oriented in different directions. Each element is designed and operative to select a $TEM_{01}$ mode. When introduced into a resonator according to the present invention, such as that shown in FIG. 1 or FIG. 3, mutually rotated at 90 degrees to each other, two $TEM_{01}$ modes with orthogonal polarizations exist in the resonator.

Figure 8:
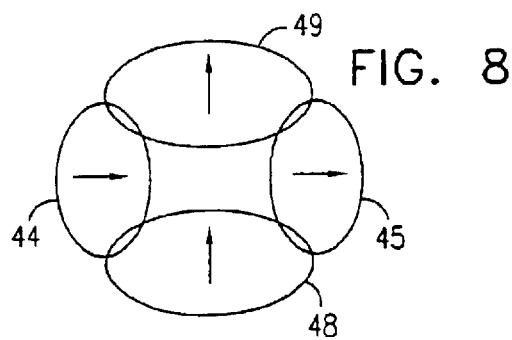
FIG. 8 is a schematic view of the near-field intensity distribution and relative polarizations of the modes of the resonator of FIG. 1 or FIG. 3 using the mode selective elements of FIG. 7.

FIG. 8 is a schematic illustration of the near-field intensity distribution of the combination of modes of the resonator of FIG. 1 or FIG. 3, resulting from the use of the mode control elements 40, 42, shown in FIG. 7. The arrows represent the polarizations of the high intensity regions of the modes. Regions 44 and 45 arise from the mode existing in the path containing mode control element 42, while regions 48 and 49 arise from the mode existing in the path with mode control element 40.

Figure 9:
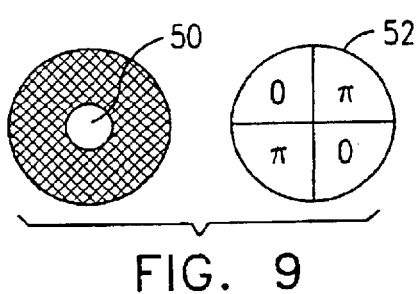
FIG. 9 is a schematic illustration of an aperture and a mode selective phase element according to a preferred embodiment of the present invention, designed and operative to select the $TEM_{00}$ and $TEM_{02}$ modes respectively.

FIG. 9 is schematic illustration of a further preferred embodiment of a pair of mode control elements, consisting of an aperture 50 that selects the $TEM_{00}$ mode and a discontinuous phase element 52 that selects the $TEM_{02}$ mode. When introduced into a resonator such as that shown in FIG. 1 or FIG. 3, a combination of modes with orthogonal polarizations exists in the resonator.

Figure 10:
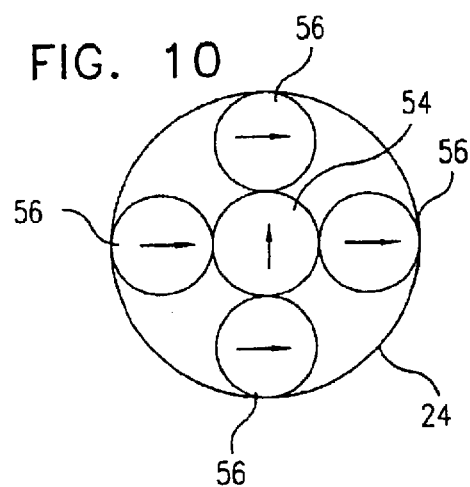
FIG. 10 is a schematic view of the near-field intensity distribution and relative polarizations of the modes of the resonator of FIG. 1 or FIG. 3 using the mode selective elements of FIG. 9.

FIG. 10 is a schematic illustration of the near-field intensity distribution of such a combination of modes. The arrows represent the polarizations of the high intensity regions. The $TEM_{00}$ mode fills the central zone 54 of the gain medium while the high intensity regions 56 of the $TEM_{02}$ mode fill the outer zone, thus achieving good filling of the entire diameter of the gain medium 24.

According to yet another preferred embodiment of the present invention, modification of the mode control element, by predetermined changes in the phase shift of the sections of the phase element of FIG. 9 that selects the $TEM_{02}$ mode, can be used for compensation of the birefringence introduced in high power solid state lasers, as described in the prior art.

Figure 11:
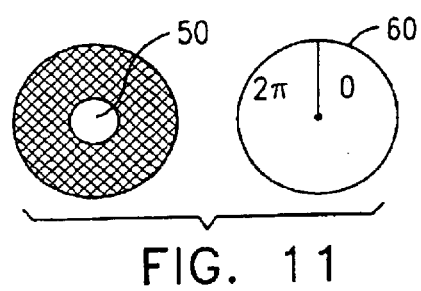
FIG. 11 is a schematic illustration of an aperture and a mode selective continuous phase element with a spiral phase distribution ranging from 0 to $2\pi$, according to a preferred embodiment of the present invention, designed and operative to select the $TEM_{00}$ and $TEM_{01*}$ modes respectively.

FIG. 11 is schematic illustration of yet another preferred embodiment of the present invention showing a combination of an aperture 50 that selects the $TEM_{00}$ mode, and a continuous phase element of spiral phase distribution 60 that selects the $TEM_{01*}$ mode. When introduced into a resonator such as that shown in FIG. 1 or FIG. 3, a combination of modes with orthogonal polarizations exist in the resonator.

Figure 12:
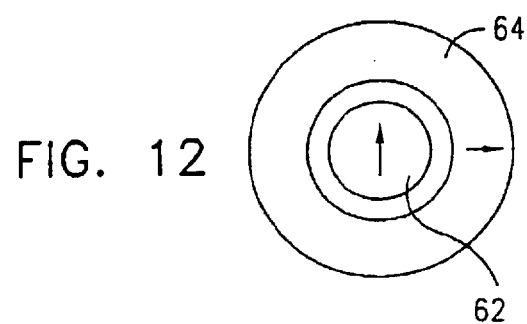
FIG. 12 is a schematic view of the near-field intensity distribution and relative polarizations of the modes of the resonator of FIG. 1 or FIG. 3 using the mode selective elements of FIG. 11.

FIG. 12 is a schematic illustration of the near-field intensity distribution pattern of such a combination of modes using the mode control elements shown in FIG. 11. The arrows represent the polarizations of the lobes. The central part 62 arises from the $TEM_{00}$ mode, while the outer ring arises from the $TEM_{0*}$ mode. Since both modes have rotational symmetry they complement each other efficiently and extract a high level of power from the gain medium volume.

FIG. 13 is schematic illustration of yet another preferred embodiment of the present invention, showing a combination of elements consisting of an aperture 50 that selects the $TEM_{00}$ mode and a discontinuous phase element 66 that selects the $TEM_{04}$ mode. When introduced into a resonator such as those of FIG. 1 or FIG. 3, a combination of modes with orthogonal polarizations exist in the resonator.

FIG. 14 is a schematic illustration of the near-field intensity distribution lobes of such a combination of modes resulting from the use of the combination of mode control elements of FIG. 13. The arrows represent the polarizations of the high intensity regions. The central part 68 arises from the $TEM_{00}$ mode, while the outer parts 70 arise from the $TEM_{04}$ mode. Since the lobes 70 of the $TEM_{04}$ modes are smaller than the high intensity regions 56 of the $TEM_{02}$ mode shown in FIG. 10, the combination of the $TEM_{04}$ mode with the TEM$_{00}$ mode is more efficient in filing the entire cross-section of the gain medium.

Reference is now made to FIG. 15 which is a schematic illustration of a linear resonator of a laser constructed and operative in accordance with yet another preferred embodiment of the present invention. The resonator consists of a gain medium 24, a full reflective element 81, an output coupling reflective element 22 and a unified polarizing and mode control element 80. Inside the resonator a beam 32 travels back and forth between the reflectors 22 and 81. The beam consists of two sets of modes, each set at a different polarization, and the resonator is designed so that the high intensity regions of one set fall generally on the low intensity regions of the other set of modes.

FIG. 16 is a schematic illustration of a preferred embodiment of a unified polarizing and mode control element 80, constructed and operative to select a combination of the mutual orthogonal polarized modes TEM$_{00}$ and TEM$_{04}$. Element 80 has an etched or deposited pattern on its face. It acts as a discontinuous phase element, in which the zones 84 create a phase shift of $\pi$ with respect to the zones 82. The element with this specific phase shift pattern presents a low loss to the TEM$_{04}$ mode thus preferentially selecting it to oscillate in the resonator. The central disk 83 has low loss in one polarization, and the zones 82 and 84 have low loss in the orthogonal polarization. Thus, when the element 80 is introduced into a laser resonator with the gain medium 24, the TEM$_{00}$ mode which is selected by the zone 83 possesses one polarization, while the mode TEM$_{04}$ which is selected by the zones 82 and 84 has the orthogonal polarization. In one preferred embodiment the zones are constructed and operative to have a polarization dependent loss by etching or deposition of a diffractive grating having subwavelength period, as is known in the art. The element 80 can preferably be made of any material such as fused silica, glass, zinc selenide, or any other suitable material used for transmissive or reflective optical components.

FIG. 17 is a schematic illustration of yet another preferred embodiment of the present invention, showing a combined polarizing and mode control element 90 constructed and operative to select a combination of two orthogonally polarized TEM$_{01}$ modes. Element 90 has an etched or deposited pattern on its surface. This pattern acts as a discontinuous phase element, in which zone 97 creates for both polarizations, a phase shift of $\pi$ with respect to the zone 95. The patterns of zones 96 and 98 introduce different phase shifts to the two different orthogonal polarizations, zone 96 introducing a phase shift of $\pi$ with respect to zone 95 for the '1' polarization and no phase shift for the '2' polarization, and zone 98 introducing a phase shift of $\pi$ with respect to the '2' polarization and no phase shift for the '1' polarization. This is preferably achieved with the aid of a diffractive grating of subwavelength period, as described for the element shown in FIG. 16. Thus, the single element 90 acts in a similar manner to the two elements described in FIG. 5, allowing two TEM$_{01}$ modes with orthogonal polarizations to co-exist when inserted into a laser resonator according to the present invention, preferably of the type shown in FIG. 15.

FIG. 18 is a schematic illustration of yet another preferred embodiment of a laser resonator according to the present invention. The resonator consists of the same elements as the resonator of FIG. 15, but the unified polarization and mode control element 80 is introduced close to the output coupling reflecting element 22. In this configuration, the lobes of the output beam 33 are generally in phase. As a result, no additional adjusting phase element is needed outside the resonator to properly focus the beam 33 to a small spot for various applications.

FIG. 19 is a schematic illustration of a laser resonator according to yet another preferred embodiment of the present invention. The resonator is similar to the embodiments of FIG. 1 and FIG. 2, but is constructed such that two laser output beams, each of a different polarization, emerge separately. The polarizing element 106 can preferably be either a thin film beam splitter 26 or a prism beam splitter 27. A total reflector 102 replaces the partial reflector (output coupler) 22 of FIG. 1, and two partial reflectors (output couplers) 100 and 101 replace the total reflectors 20 and 21 respectively of FIG. 1. In this embodiment, therefore, two output beams 103 and 104 are obtained. One output beam 103, possesses mode 30, and emerges through output coupler 100, and the other output beam 104 of mode 31, emerges through the output coupler 101. These two beams can then be combined into a single beam using an additional external optical system that includes a polarizing beam splitter (combiner) element such as 26 or 27.

FIG. 20 is a schematic illustration of a laser resonator according to yet another preferred embodiment of the present invention. The resonator is similar to the embodiment of FIG. 3, but two laser output beams, each of a different polarization, emerge separately. A total reflector 102 replaces the partial reflector (output coupler) 22 of FIG. 3, and two partial reflectors 100 and 101 replace the total reflectors 20 and 21 respectively of FIG. 3. Like the embodiment shown in FIG. 19, two output beams 103 and 104 exist. One output beam 103, has mode 30, and emerges through output coupler 100, and the other output beam 104 has mode 31, and emerges through the output coupler 101. These two beams can then be recombined into a single beam using an additional external beam displacer (combiner) element 34.

Figure 21:
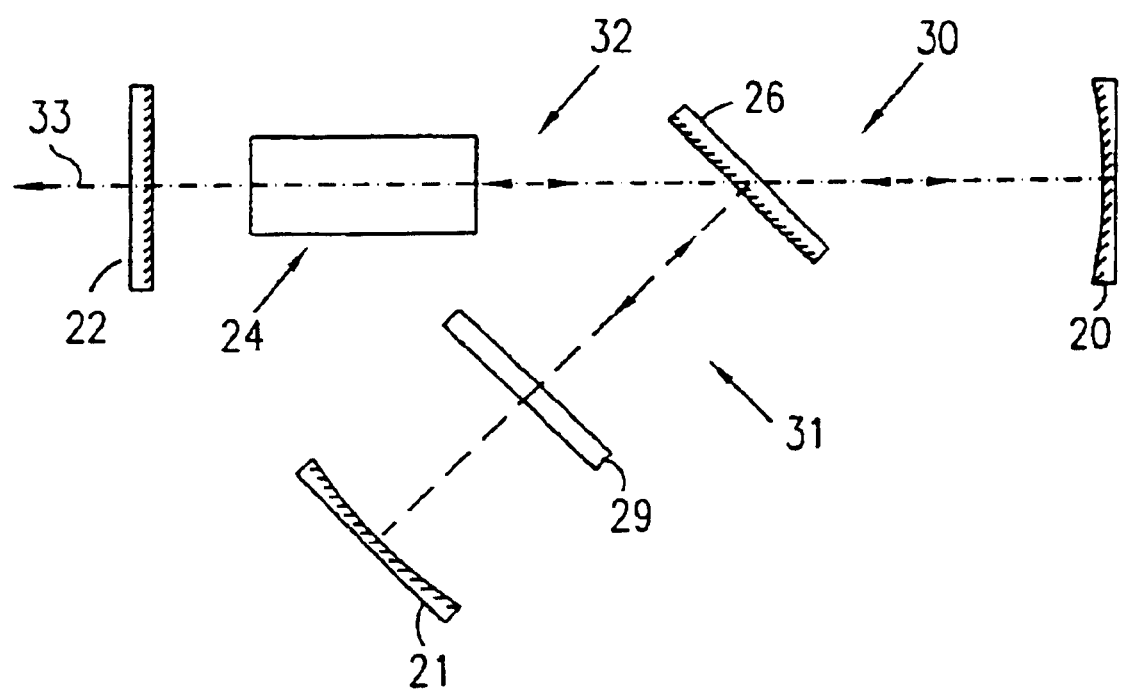
FIG. 21 is a schematic illustration of a linear resonator of a laser constructed and operative in accordance with a preferred embodiment of the present invention, similar to that shown in FIG. 1, but using only a single mode control element.

Reference is now made to FIG. 21, which is a schematic illustration of a laser resonator according to yet another preferred embodiment of the present invention. The resonator is similar to the embodiments of FIG. 1, except that only one mode control element 29 is used in one arm of the resonator. This mode control element is operative to select one mode or set of modes of one polarization, while a second mode or set of modes of orthogonal polarization is preferentially selected by means of gain depletion of this first mode in the gain medium 24.

Figure 22A:
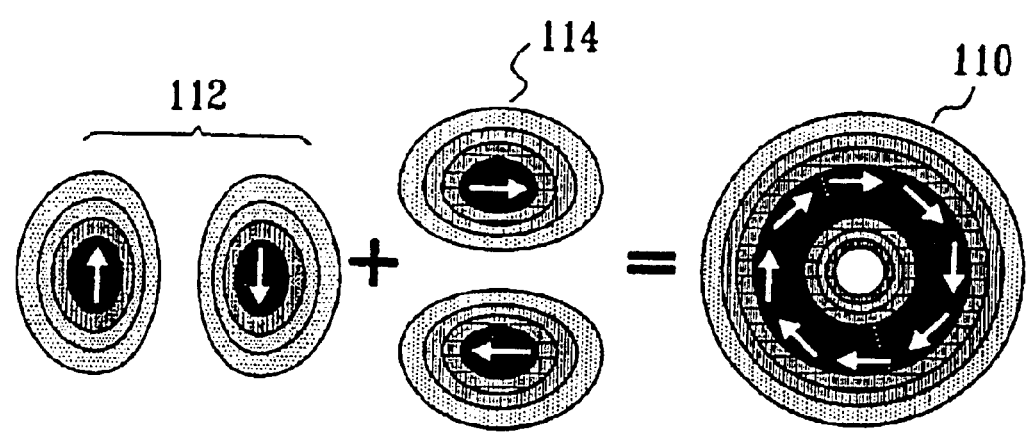
FIGS. 22A and 22B are schematic drawings of the way in which coherent superposition of two orthogonally polarized $TEM_{01}$ modes results in azimuthally or radially polarized beams respectively.
Figure 22B:
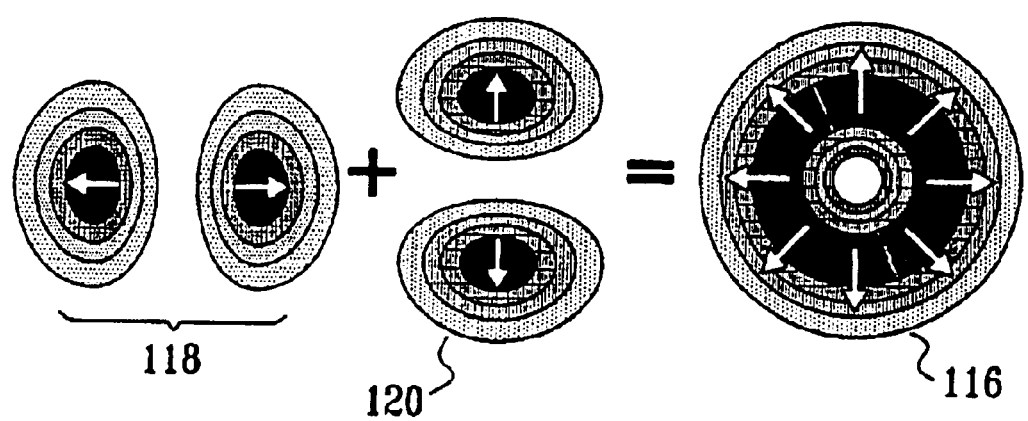

Reference is now made to FIGS. 22A and 22B, which are schematic drawings of the manner in which coherent superposition of two orthogonally polarized modes result in azimuthally or radially polarized beams. FIG. 22A depicts an azimuthally polarized beam 110, obtained by a coherent summation of a vertically polarized TEM$_{01(hor)}$ mode 112 and a horizontally polarized TEM$_{01(ver)}$ mode 114, as obtained according to a preferred embodiment of the present invention. FIG. 22B shows a radially polarized beam 116, obtained by a coherent summation of an horizontally polarized TEM$_{01(hor)}$ mode 118 and a vertically polarized TEM$_{01(ver)}$ mode 120, as obtained according to another preferred embodiment of the present invention. The suffixes (hor) and (ver) refer to the orientation of the TEM$_{01}$ mode lobes with respect to the nominal horizontal and vertical directions of the drawing.

Reference is now made to FIG. 23A, which is a schematic drawing of the laser resonator configuration, according to another preferred embodiment of the present invention, in which specific transverse modes are selected and coherently summed. This preferred embodiment is similar in construction and operation to the laser configuration shown in FIG. 4, but with the addition of a phase adjusting element 122, whose function will be described hereinbelow. In FIG. 23A, the light propagating inside the laser and through the gain medium 139 is preferably split and displaced by means of a birefringent beam displacer 124 to obtain two separate paths 126, 128, wherein the beams are orthogonally polarized with respect to each other. Path 126 is shown having polarization in the vertical direction, and path 128 in the horizontal direction. Differently oriented discontinuous phase elements 130, 132, are inserted into each path, preferably adjacent to the back mirror 134, to select the $TEM_{01}$ mode. Specifically, one of these modes is selected to be $TEM_{01(hor)}$, and the other to be $TEM_{01(ver)}$. In the embodiment shown in FIG. 23A, the two phase elements are fabricated on the same substrate 136, as previously shown in the embodiment of FIG. 5.

In order to add the two modes coherently with the appropriate phase between them, a phase adjusting element 122 is inserted into one of the paths, in the region after separation, so as to control the optical path length in that path, and hence the phase difference between the beams propagating in the two paths. According to various preferred embodiments of the present invention, this phase adjustment element could be a transmissive plate, and the phase relation adjusted by adjusting the orientation of the plate in the beam path. According to other preferred embodiments, this phase adjustment element could be a material whose refractive index can be adjusted by application of an electric field, or any other suitable element capable of adjusting the phase of the beam propagating in its path.

At the back mirror 134, two spatially separated $TEM_{01}$ modes evolve, each with a different linear polarization. However, as a result of the coherent summation of these two modes, produced by correct adjustment of the relative phase of the two beams with the adjuster 122, a circularly symmetric doughnut shaped beam 137 radially or horizontally polarized emerges from the output coupler 138.

Reference is now made to FIG. 23B, which is a schematic drawing of the laser resonator configuration, according to yet another preferred embodiment of the present invention, in which specific transverse modes are selected and coherently summed. This preferred embodiment is similar in construction and operation to the laser configuration shown in FIG. 23A, but differs in that each path of the two differently polarized beams has its own rear mirror 140, 142, and the phase adjustment is performed by mechanical adjustment of the length of one of the beam paths preferably by a mechanical micrometric motion mechanism 144 on its end mirror. According to other preferred embodiments, the motion of one of the reflectors along the beam optical axis may alternatively be performed by using a piezoelectric device, a motion device actuated by heat expansion, a pressure dependent device, a magnetostrictive device, a linear stepping motor, or any other device capable of providing accurately controlled micro-motion.

The embodiments shown in FIGS. 23A and 23B utilize a birefringent beam displacer 124 to obtain the two paths with orthogonally polarized modes, similar to the embodiment shown in FIG. 3 above. It should be understood, though, that according to other preferred embodiments of the present invention, in the generation of azimuthally or radially polarized beams by means of coherent superposition of two orthogonally polarized modes, the orthogonally polarized modes can also be separated by using any other configuration of polarizing beam separation elements, such as that in the preferred embodiment shown in FIG. 1, where a thin film polarizing beam splitter is used, or in the preferred embodiment of FIG. 2, where a birefringent prism, such as a "Glan-Thompson" or a "Glan Laser", prism is used. In any of these other preferred embodiments, the phase adjustment element is disposed in one of the orthogonally polarized beam paths.

It should be pointed out that it is the use of the phase adjustment element shown in the embodiments of FIGS. 23A and 23B which constitutes an important difference between the method of performing coherent summation according to these preferred embodiments, and the methods used in the previous embodiments of FIGS. 1 to 21, where the mode summation is not performed coherently, and the object is to increase the utilization of the gain medium, without regard to the relative phase of the beams propagating in the two orthogonal paths.

It will be appreciated by persons skilled in the art that the present invention is not limited by what has been particularly shown and described hereabove. Rather the scope of the present invention includes both combinations and subcombinations of various features described hereinabove as well as variations and modifications thereto which would occur to a person of skill in the art upon reading the above description and which are not in the prior art.

We claim:

1. An optical resonator comprising:

reflectors;

at least one polarizing element; and first and second optical mode control elements, configured to create first and second transverse oscillation modes respectively, said first transverse mode having a first polarization and said second oscillation mode having a second polarization, said second polarization being orthogonal to said first polarization; and wherein said first and second polarizations simultaneously coexist within a common path of the optical resonator.

2. An optical resonator according to claim 1, and wherein said first and second transverse oscillation modes comprises a single mode.

3. An optical resonator according to claim 2, and wherein said single mode is essentially the $TEM_{00}$ mode of said resonator.

4. An optical resonator according to claim 1, and also comprising a first and a second path, and wherein said polarizing element directs radiation of said first transverse oscillation modes along said first path of said resonator, and radiation of said second transverse oscillation modes along said second path of said resonator, each of said at least two optical mode control elements being disposed in one of said paths, such that each of said paths supports a different one of said first and second transverse oscillation modes.

5. An optical resonator according to claim 4, and wherein said first and said second paths are at an angle to each other.

6. An optical resonator according to claim 4, and wherein said first and said second paths are parallel to each other.

7. An optical resonator according to claim 1, and wherein said resonator is a passive resonator.

8. An optical resonator according to claim 1, and wherein said resonator is an active resonator.

9. An optical resonator according to claim 8, and also comprising a common path, through which radiation of said first transverse oscillation mode and of said second transverse oscillation mode passes, and a gain medium located in said common path.

10. An optical resonator according to claim 9, and also comprising two partial reflectors arranged such that two output beams are obtained from said resonator.

11. An optical resonator according to claim 1 and wherein one of said at least one polarizing element and one of said at least one mode control element are constructed on a single element.

12. An optical resonator according to claim 1, and wherein said polarizing element is selected from a group consisting of a beam splitter, a birefringent crystal, and a thin film polarizer.

13. An optical resonator according to claim 1, and wherein at least one of said at least two mode control elements is selected from a group consisting of a discontinuous phase element, a continuous phase element, a spatial amplitude modulation element, a reflective element, a transmissive element and a diffractive element.

14. An optical resonator according to claim 1, and wherein said polarizing element has a subwavelength pattern.

15. An optical resonator according to claim 1 and wherein said mode control elements are disposed on the same physical optical substrate element.

16. An optical resonator according to claim 1, and being a ring optical resonator.

17. An optical resonator according to claim 1, and being an unstable optical resonator.

18. An optical resonator according to claim 1, and wherein said reflectors have radii of curvature different from each other.

19. An optical resonator according to claim 1, and wherein said polarizing element is made of a material selected from a group consisting of calcite, $YVO_4$ and $\alpha$-BBO.

20. An optical resonator according to claim 1 and wherein said first set of modes comprises a $TEM_{00}$ mode and said second set of modes comprises a mode selected from the group consisting of a $TEM_{02}$ mode, a $TEM_{01*}$ mode, a $TEM_{04}$ mode and a super-Gaussian mode.

21. An optical resonator according to claim 1 and wherein both sets of modes comprise $TEM_{01}$ modes.

22. An optical resonator according to claim 1 and wherein said first set of modes comprises $TEM_{00}$ and $TEM_{04}$ modes, and said second set of modes comprises a $TEM_{04}$ mode.

23. An optical resonator according to claim 1, wherein each of said first and second set of transverse oscillation modes are aligned and have regions of higher intensity and regions of lower intensity; and wherein the regions of higher intensity of said first set of modes are spatially coincident with the lower intensity regions of said second set of modes and vice versa.

24. A laser comprising:
an optical resonator having a gain medium, said resonator comprising first and second optical mode control elements, wherein said resonator simultaneously supports first and second set of transverse oscillation modes created by said first and second optical mode control elements, respectively, each of said first and second set of modes having regions of higher intensity and regions of lower intensity, and wherein said first and a second modes are orthogonally polarized such that said gain medium is simultaneously utilized by both of said first and second sets of modes.

25. A laser according to claim 24, and wherein at least one of said first and second sets of modes comprises a single mode.

26. A laser according to claim 24, and wherein said first and second sets of modes are arranged such that at least one region of higher intensity of said first set of modes and at least one region of lower intensity of said second set of modes are essentially spatially coincident.

27. A method of increasing the volume utilization of the gain medium of a laser, comprising the steps of:
providing a laser comprising a resonator with said gain medium;
providing at least one polarizing element;
providing at least two optical mode control elements; and
disposing said at least one polarizing element and said at least two mode control elements within said resonator, such that said resonator supports simultaneously first and second sets of transverse oscillation modes with orthogonal polarization, each of said sets of modes having regions of higher intensity and regions of lower intensity.

28. A method of increasing the volume utilization of the gain medium of a laser according to claim 27, and wherein said at least two optical mode control elements comprises two optical mode control elements.

29. A method of increasing the volume utilization of the gain medium of a laser according to claim 27, and also comprising the step of arranging said at least two optical mode control elements such that there is essentially spatial coincidence of at least one region of higher intensity of said first set of modes and at least one region of lower intensity of said second set of modes, so that the volume of said gain medium is effectively utilized by both of said sets of modes simultaneously.

30. A method of increasing the volume utilization of the gain medium of a laser according to claim 27, and wherein at least one of said first and second sets of modes comprises a single mode.

31. An optical resonator comprising:
reflectors;
at least one polarizing element;
a gain medium; and
an optical mode control element selectively attenuating all but a first set of modes propagating in said resonator, said first set of modes having regions of higher intensity and regions of lower intensity;
wherein gain depletion in said gain medium, from at least one region of higher intensity of said first set of modes, is such that at least a second set of modes with polarization orthogonal to said first set of modes, and having regions of higher intensity and regions of lower intensity, also propagates in said resonator.

32. An optical resonator according to claim 31, and wherein said gain depletion is such that said at least one region of higher intensity of said second set of modes falls in a region of said gain medium having at least one region of lower intensity of said first set of modes.

33. An optical resonator according to claim 31, and wherein at least one of said first and second sets of modes comprises a single mode.

* * * * *